United States Patent
Matsuno et al.

(10) Patent No.: US 7,535,951 B2
(45) Date of Patent: May 19, 2009

(54) CODE DIVISION MULTIPLEXING COMMUNICATION SYSTEM

(75) Inventors: Kazuhiko Matsuno, Kanagawa (JP); Masayuki Kashima, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 681 days.

(21) Appl. No.: 11/305,341

(22) Filed: Dec. 19, 2005

(65) Prior Publication Data

US 2006/0146778 A1 Jul. 6, 2006

(30) Foreign Application Priority Data

Dec. 20, 2004 (JP) ............................. 2004-367616

(51) Int. Cl.
*H04B 1/707* (2006.01)

(52) U.S. Cl. ..................................... 375/146

(58) Field of Classification Search ................ 375/140, 375/141, 146; 370/320, 335, 342, 441
See application file for complete search history.

(56) References Cited

U.S. PATENT DOCUMENTS 6,310,907 B1 * 10/2001 Tsujimoto ................. 375/141
7,092,431 B2 * 8/2006 Maeda et al. ............... 375/144
7,457,348 B2 * 11/2008 Rice ........................... 375/146

FOREIGN PATENT DOCUMENTS

JP        2004-080385        8/2002

* cited by examiner

*Primary Examiner*—Don N Vo
(74) *Attorney, Agent, or Firm*—Venable LLP; James R. Burdett

(57) ABSTRACT

A code division multiplexing communication system which transmits a single signal array in use of band for two channels. A first data generator generates a channel signal array. A data distributor branches the channel signal array into two. A first spread modulator converts one of the branch signal array to a signal array having values VL and VH by performing spread modulation in use of a predetermined spread code. A second spread modulator converts the other branch signal array to a signal array having signal values VL, VH and high impedance and then performs spread modulation in use of the same spread code as the first spread modulator. The outputs of the first and the second spread modulator are superimposed by an adder. Accordingly, a quaternary signal array using band for two channels can be generated.

12 Claims, 11 Drawing Sheets

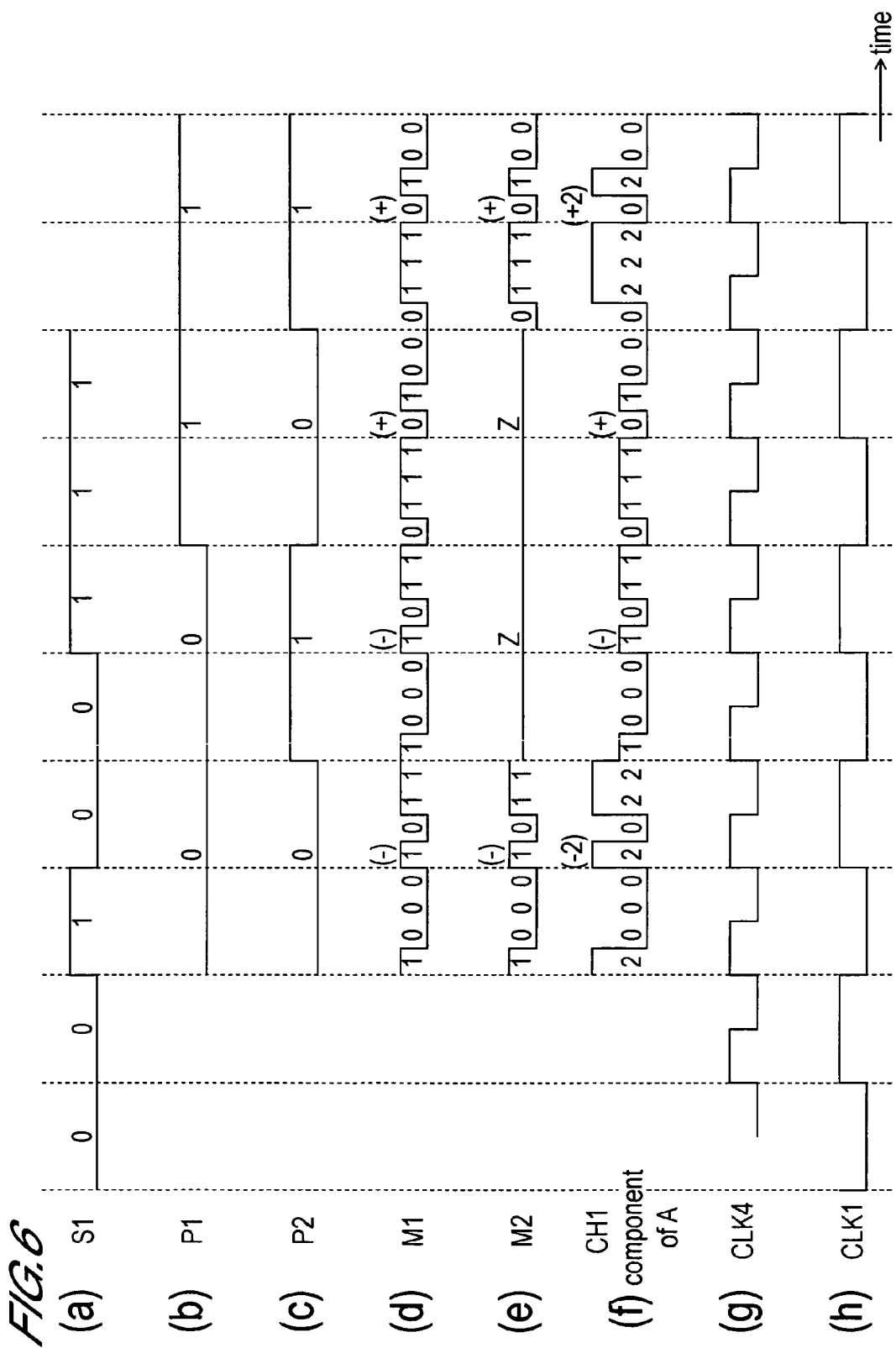

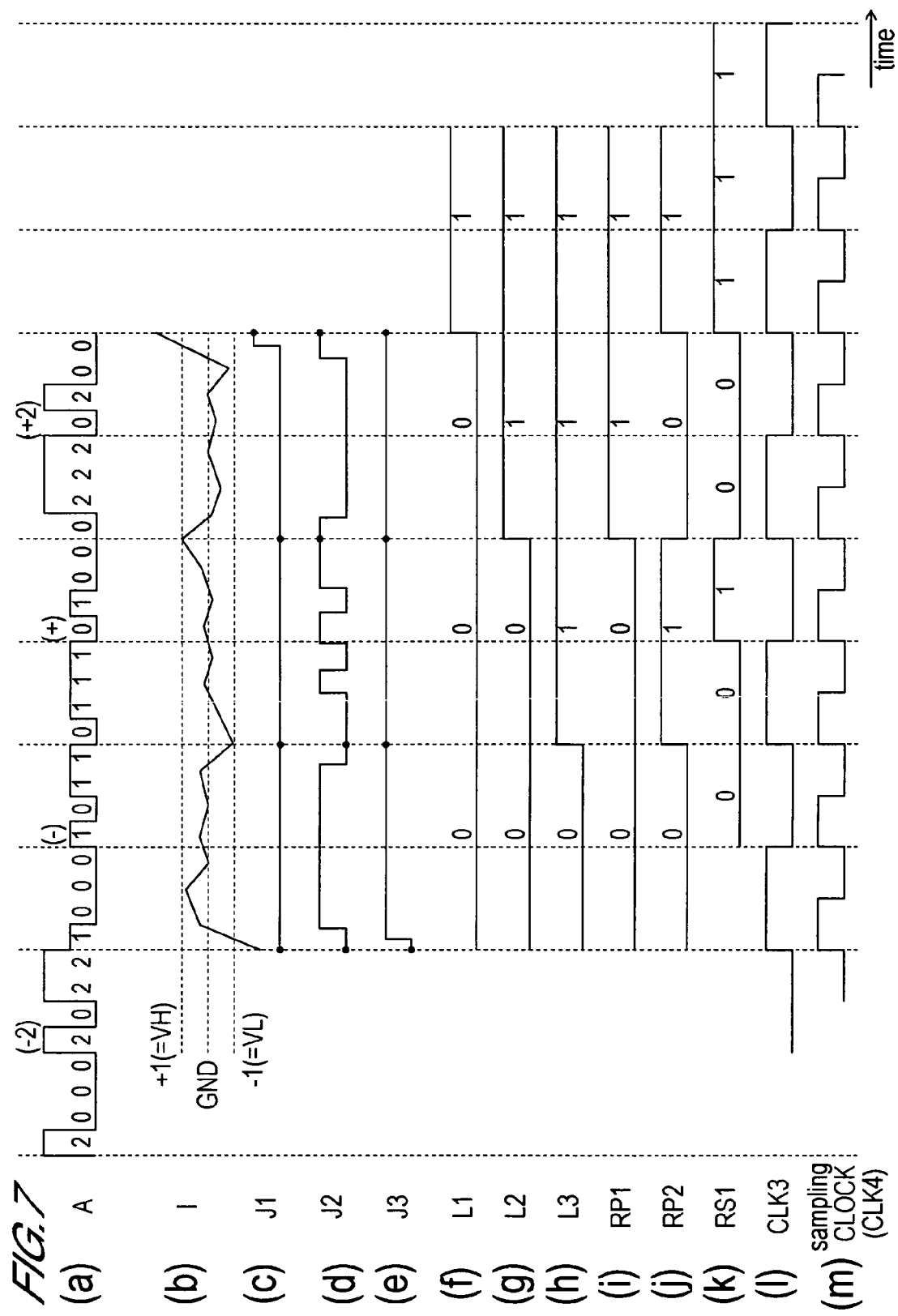

FIG.8A

| p1,p2 | 0,0 | 0,1 | 1,0 | 1,1 |
|---|---|---|---|---|
| M1 | 0 | 0 | 1 | 1 |
| M2 | 0 | high impedance | high impedance | 1 |
| CH1 component of A | 2xVL (-2) | VL (-1) | VH (+1) | 2xVH (+2) |

FIG.8B

| I | 2xVL (-2) | VL (-1) | VH (+1) | 2xVH (+2) |
|---|---|---|---|---|
| L1 | 0 | 0 | 0 | 1 |
| L2 | 0 | 0 | 1 | 1 |
| L3 | 0 | 1 | 1 | 1 |
| RP1 | 0 | 0 | 1 | 1 |
| RP2 | 0 | 1 | 0 | 1 |

CODE DIVISION MULTIPLEXING COMMUNICATION SYSTEM

BACKGROUND OF THE INVENTION

1. Field of the Invention

The present invention relates to a communication system which performs signal multiplexing in use of a Code Division Multiplexing (CDM) method.

2. Description of Related Art

Conventionally, as a technique for multiplexing signal arrays of a plurality of channels, a Code Division Multiplexing method is known. As the Code Division Multiplexing method, such as Synchronous Code Division Multiplexing method, Asynchronous Code Division Multiplexing method and Quasi-Synchronous Code Division Multiplexing method are known. The Synchronous Code Division Multiplexing method is superior to other methods in that the number of multiplexing in a code length (that is, the number or chips) becomes larger. As a document disclosing the Synchronous Code Division Multiplexing method, Japanese Patent Application Laid-Open No. 2004-80385 is known, for example.

FIG. 9 is a schematic diagram showing an example of a communication system in which the Synchronous Code Division Multiplexing method is employed. In the example shown in FIG. 9, a transceiver 910 is connected to a plurality of receivers 930-1 to 930-$n$ via a distributor 920. The transceiver 910 performs code division multiplexing for a plurality of signal arrays to transmit to the receivers 930-1 to 930-$n$. Each of the receivers 930-1 to 930-$n$ demultiplexes a signal array corresponding to a relevant channel (one of channels CH1 to CH$n$) among the code division multiplexed signal arrays.

FIG. 10 is a block diagram showing an example of an internal structure of the transceiver 910. According to the transceiver 910 in FIG. 10, each of data generators 911-1 to 911-$n$ generates a signal array to provide to the receivers 930-1 to 930-$n$. Spread modulators 912-1 to 912-$n$ retrieve signal arrays from the corresponding data generators 911-1 to 911-$n$ respectively and multiply spread codes (for example, Orthogonal Gold Codes or Walsh Codes) D1 to D$n$. Here, different values are used for the respective spread codes D1 to D$n$. Then, an adder 913 adds the spread modulated signal arrays M1 to M$n$ mutually so that a code division multiplexed signal array is generated.

FIG. 11 is a block diagram showing an example of an internal structure of the receivers 930-1 to 930-$n$. According to the receivers 930-1 to 930-$n$ shown in FIG. 11, a matched filter 931 multiplies a code (one of the codes D1 to D$n$) which is used for the coding on the code division multiplexed signal array to separate a signal array corresponding to the spread code. For example, in order to separate a signal array which is multiplied with the spread code D1, the spread code D1 is multiplied to the code divisional multiplexed signal array. A comparator 932 compares each signal bit value of the separated signal array with a threshold value. A signal array indicating a determination result is latched by a latch 933 and output being synchronized with a sampling clock. Accordingly, one of the signal arrays S1 to S$n$ (See FIG. 10) is reproduced.

As shown in FIGS. 9 to 11, the respective receivers 930-1 to 930-$n$ use different spread codes D1 to D$n$. In a typical communication system, the respective receivers 930-1 to 930-$n$ stores a single spread code which is used for own code division demultiplexing and any other spread codes are not stored. Therefore, the respective receivers 930-1 to 930-$n$ cannot restore signal arrays addressed to other receivers. Accordingly, security for users of the respective receivers 930-1 to 930-$n$ is maintained.

In a typical communication system, the transceiver 910 does not always transmit data to all of the receivers 930-1 to 930-$n$. In other words, in many cases, one or more channels CH1 to CH$n$ are unoccupied. Therefore, in such conventional communication system, there often exists a band which is not in use and so bandwidth efficiency is low.

Applying an unoccupied channel for a transmission addressed to another receiver may be viewed as a way to use the unoccupied band efficiently. However, in case that a single channel is shared by a plurality of receivers, the above described security cannot be maintained as a single spread code may be shared by the plurality of receivers. In addition, a plurality of matched filters 931 are required to be provided to the respective receivers 930-1 to 930-$n$, so the cost of the receivers will be increased.

SUMMARY OF THE INVENTION

An object of the present invention is to provide a code division multiplexing communication system with high bandwidth efficiency at a low price, without decreasing the level of security.

A code division multiplexing communication system according to embodiments of the present invention includes a transceiver having: a first data generator which generates a first channel signal array having signal value VL and VH (VL<VH, VL≠0, VH≠0 and 2×VL≠VH); a data distributor which branches the first channel signal array into a first branch signal array and a second branch signal array which are synchronous each other; a first spread modulator which performs spread modulation on the first branch signal array in use of a first spread code; a second spread modulator which converts the second branch signal array to a signal array having signal value VL, VH and high impedance, and perform spread modulation on the converted signal array in use of the first spread code; and an adder which superimposes the modulated signal arrays output from the first spread modulator and the second spread modulator to generate a code division multiplexed quaternary signal array.

BRIEF DESCRIPTION OF THE DRAWINGS

Other objects and benefits of the present invention will be described with reference to the following attached drawings.

FIG. 6 is a timing chart showing a high-speed communication operation of the transceiver according to the embodiment;

FIG. 7 is a timing chart showing a high-speed communication operation of the receiver according to the embodiment;

FIG. 8A and FIG. 8B are tables showing a high-speed communication operation of the transceiver and the receiver according to the embodiment;

DESCRIPTION OF THE PREFERRED EMBODIMENT

Figure 1:
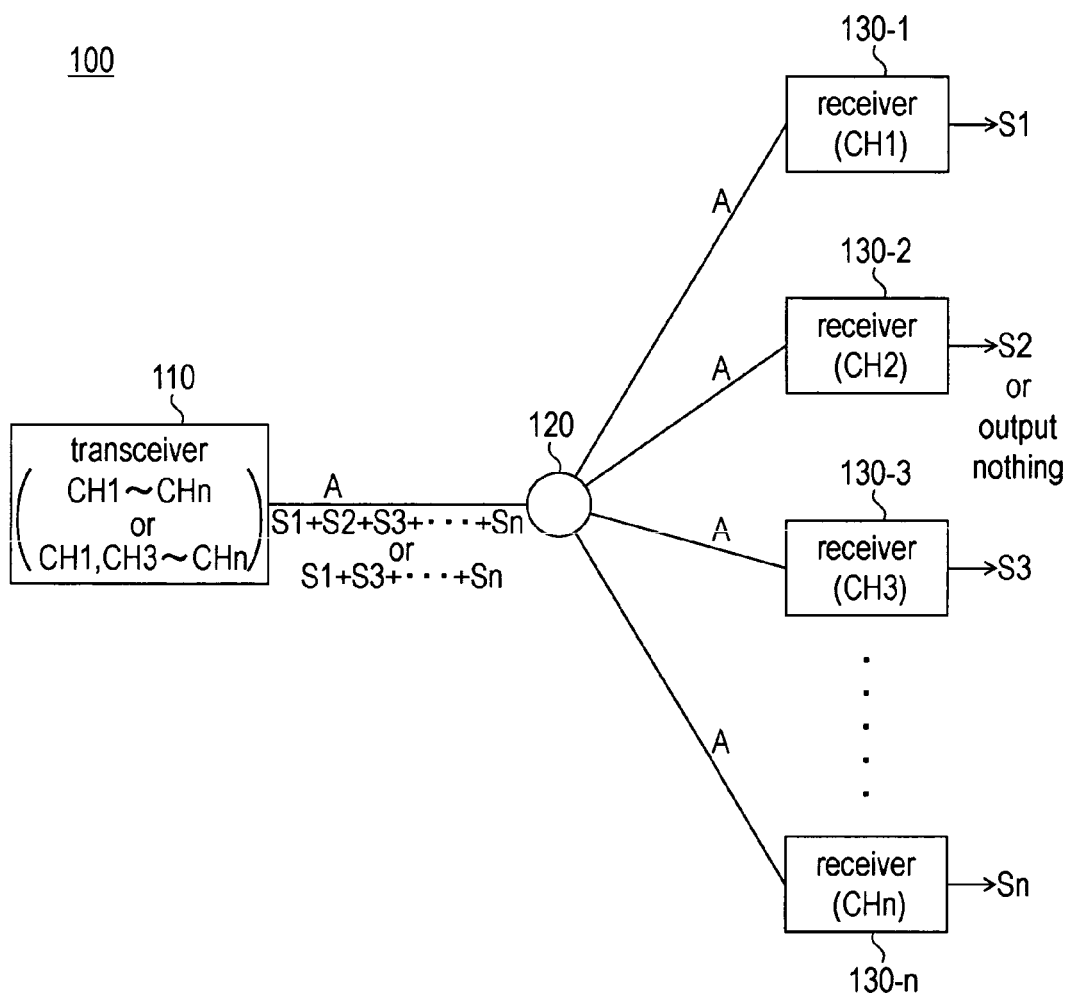
FIG. 1 is a conceptual view showing an entire structure of a communication system according to an embodiment of the invention.

Embodiments of the present invention will be described below with reference to the drawings. In the drawings, sizes, shapes or placements of each element are schematically shown so as to make the invention understandable. Further, the numerical conditions explained below are only shown as examples.

An embodiment of the present invention will be explained with reference to the drawings. It is noted that, in the drawings, sizes, shapes or placements of each element are schematically shown so as to make the invention understandable. Further, the numerical conditions explained below are only shown as examples.

FIG. 1 is a conceptual view showing an entire structure of a communication system according to an embodiment of the present embodiment.

As shown in FIG. 1, a communication system 100 includes a transceiver 110, a distributor 120, and a plurality of receivers 130-1 to 130-n.

The transceiver 110 performs code division multiplexing of signal arrays transmitted in channels CH1 to CHn, which are channel signal arrays S1 to Sn. The code division multiplexed signal arrays are output from the transceiver 110. In case that the channel signal array S2 in the channel CH2 is not required to be transmitted, the transceiver 110 uses the band of the channel CH2 for the transmission of the channel CH1. That is, when the channel CH2 is not used, the band usable for the channel CH1 is doubled (described below).

The distributor 120 branches the code division multiplexed signal array A which is output from the transceiver 110 (signals of channel CH1 to CHn or signals of channels CH1 and CH3 to CHn) and transmits the branch signals to the receivers 130-1 to 130-n.

The receivers 130-1 to 130-n separate signal arrays corresponding to a relevant channel (any of signal arrays S1 to Sn) from the code division multiplexed signal arrays A.

Figure 2:
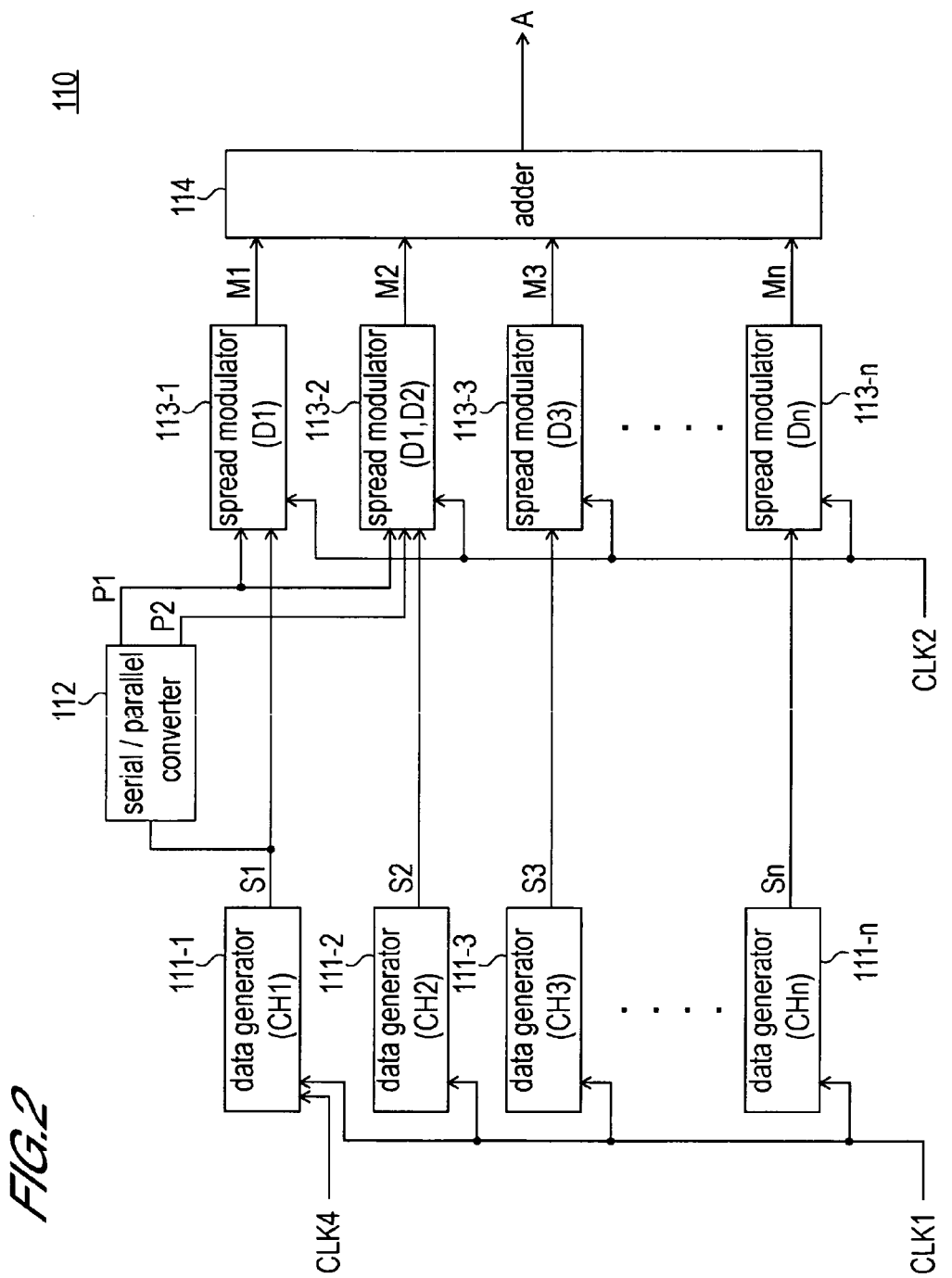
FIG. 2 is a block diagram schematically showing a structure of a transceiver according to the embodiment.

FIG. 2 is a block diagram schematically showing a structure of the transmitter according to the present embodiment.

As shown in FIG. 2, the transceiver 110 of the present embodiment includes data generators 111-1 to 111-n, a serial-parallel converter 112, spread modulators 113-1 to 113-n and an adder 114.

The data generators 111-1 to 111-n generate channel signal arrays S1, S2, . . . , Sn of the corresponding channels respectively. The channel signal arrays S1, S2, . . . , Sn are always composed of bit signals (i.e. binary signals). In the present embodiment, signal values of the channel signal arrays S1 to Sn are defined as VL and VH (VL<VH). As described below, when a transmission is implemented in a use of band of two channels, four kinds of signal values 2×VL, VL, VH and 2×VH exist after the code multiple separation is performed inside the receiver. Therefore, the signal values VL and VH of the channel signal array are set so that the four kinds of levels 2×VL, VL, VH and 2×VH are all different values. In other words, the values of signal values VL and VH are set so as to satisfy VL≠0, VH≠0 and 2×VL≠VH. In the present embodiment, VL is set as "−1" and VH is set as "+1". As described below, when transmission is implemented in a used of band of two channels, the data generators double the bit rate of the channel signal array S1.

The serial-parallel converter 112 generates a first branch signal array P1 and a second branch signal array P2 by branching the channel signal array S1 by one bit alternatively. Then, the serial-parallel converter 112 provides the first branch signal array P1 to the spread modulators 113-1 and 113-2 and the second branch signal array P2 to the spread modulator 113-2. In the present embodiment, only a serial-parallel converter which branches the signal array S1 into two to provide to the spread modulators 113-1 and 113-2, that is, a serial-parallel converter which uses band corresponding to the channel CH2 for the transmission of the signal array S1, is shown. However, it is also possible to provide a serial-parallel converter which branches the signal array S2 into two to provide to the spread modulators 113-1 and 113-2. Further, it is possible to provide a serial-parallel converter for sharing bands in other combinations.

The spread modulators 113-1 to 113-n perform spread modulation to input signal arrays to generate modulated signals M1 to Mn. Among these spread modulators 113-1 to 113-n, the spread modulator 113-1 inputs the channel signal array S1 of the channel CH1 or the first branch signal array P1 and performs spread modulation on the signal array S1 or P1 in use of a spread code D1. Further, the spread modulator 113-2 performs spread modulation on the channel signal array S2 of the channel CH2 in use of a spread code D2, or on the second branch signal array P2 of the channel CH1 in use of the spread code D1. When performing spread modulation on the channel signal array P2, the spread modulator 113-2 works on the modulated signals according to the relevant bit values of the first branch signal array P1 (described below). The spread modulators 113-3 to 113-n perform spread modulation on the channel signal arrays S3 to Sn of the channels CH3 to CHn in use of the corresponding spread codes D3 to Dn.

The adder 114 adds the modulated channel signal arrays M1 to Mn which are input from the spread modulators 113-1 to 113-n mutually. Accordingly, the code division multiplexed signal array A is obtained.

Figure 3:
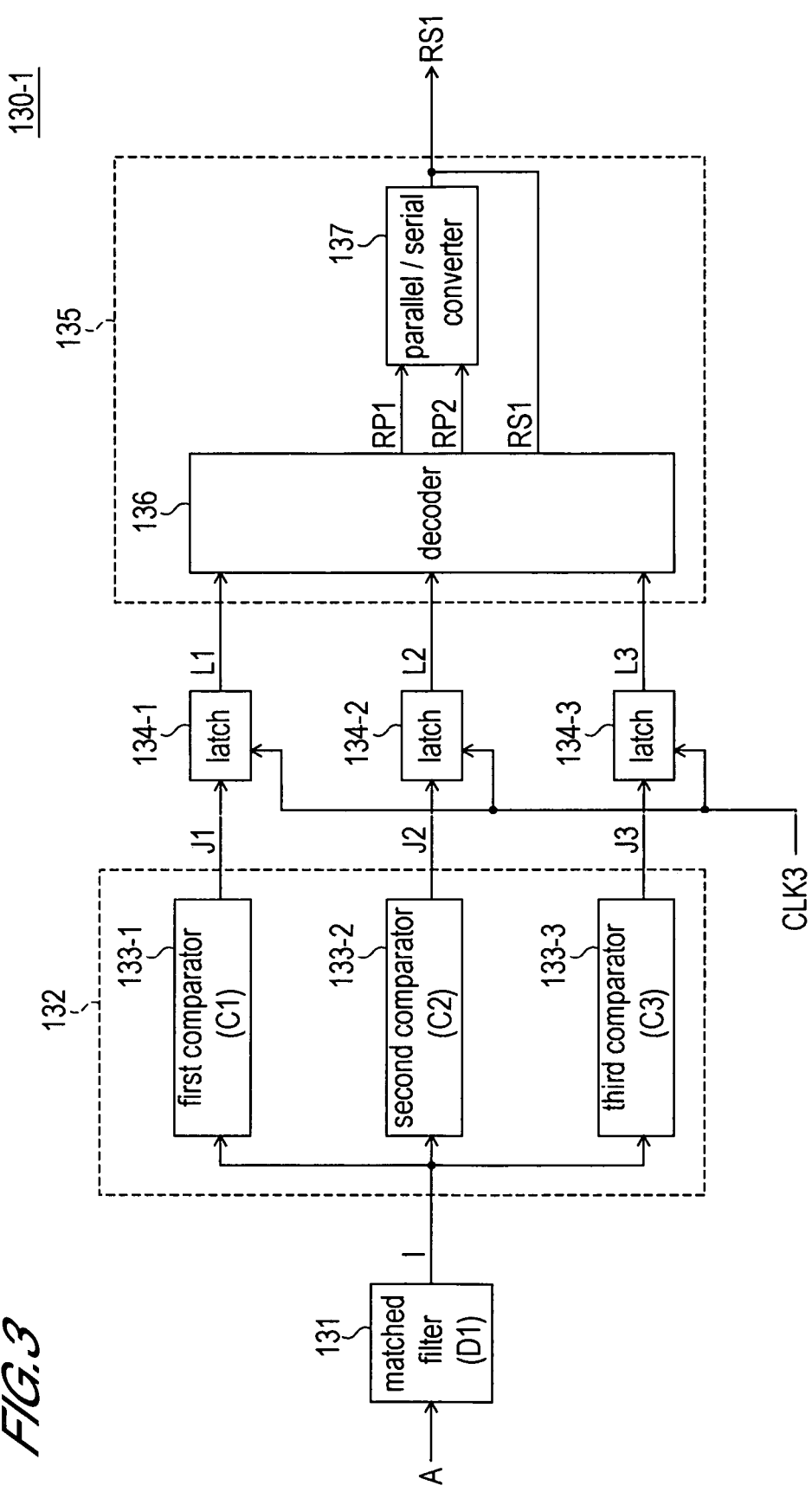
FIG. 3 is a block diagram schematically showing a structure of a receiver according to the embodiment.

FIG. 3 is a block diagram schematically showing a structure of the receiver 130-1.

As shown in FIG. 3, the receiver 130-1 includes a matched filter 131, a determiner 132, latches 134-1 to 134-3 and a data restorer 135.

The matched filter 131 performs code division separation on a correlation signal corresponding to the channel CH1 from the received code division multiplexed signal array A, in use of the spread code D1.

The determiner 132 determines each of the bit values of the correlation signals separated by the matched filter 131 is which of 2×VL, VL, VH or 2×VH. For the determination, the determiner 132 includes first to third comparators 133-1, 133-2 and 133-3. The first comparator 133-1 compares the bit values of the correlation signals with threshold values C1 (VH<C1<2×VH) sequentially. The second comparator 133-2 compares the bit values of the correlation signals with a threshold values C2 (VL<C2<VH) sequentially. Further, the third comparator 133-3 compares the bit values of the correlation signals with threshold values C3 (2×VL<C3<VL) sequentially.

The first to third latches 134-1 to 134-3 latch determination results J1 to J3 which are output from the first to third comparators 133-1 to 133-3 at a timing given by a sampling clock CLK3.

The data restorer 135 restores the channel signal array S1 in use of the output signals L1 to L3 from the latches 134-1 to 134-3. The data restorer 135 of the present embodiment includes a decoder 136 and a parallel-serial converter 137.

When communication of the channel signal array S1 is performed in use of the channels CH1 and CH2, the decoder 136 restores the first and second branch signal arrays P1 and P2 in accordance with the comparison results of the first to third comparators 133-1 to 133-3. The restored first and second branch signal arrays P1 and P2 are transmitted to the parallel-serial converter 137 as signal arrays RP1 and RP2. The parallel-serial converter 137 restores the channel signal array S1 by performing parallel-serial conversion on the signal arrays RP1 and RP2. The restored channel signal array S1 is output to as a signal array RS1.

In case that the transmission of the channel signal array S1 is implemented in use of only band for the channel CH1, an output signal L2 of the latch 134-2 becomes a restored signal array of the channel signal array S1. Therefore, the decoder 136 simply outputs the output signal L2 as the channel signal array RS1.

Figure 11:
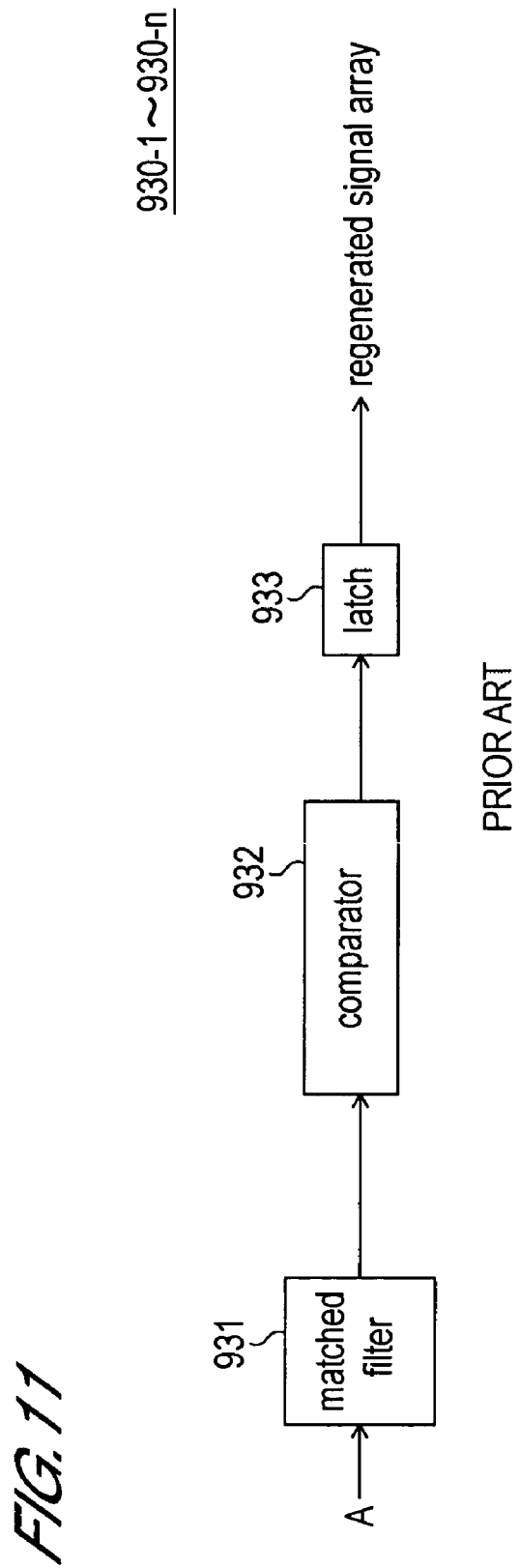
FIG. 11 is a block diagram showing an example of an internal structure of a conventional receiver.

Other receivers 130-2 to 130-n (See FIG. 1) may employ devices having the same structure as the receiver 130-1. Here, the structure of the receivers 130-2 to 130-n may employ the structure of the same device as the conventional receiver (See FIG. 11). This is because that the receivers 130-2 to 130-n perform only division multiplexing separation for the corresponding to the relevant channels CH2 to CHn.

An operation of the communication system 100 according to the present embodiment will be described with reference to FIGS. 4 to 8.

Firstly, an operation for communication of channel CH1 in use of only a band corresponding to the channel CH1 will be explained with reference to FIGS. 4 and 5.

Figure 4:
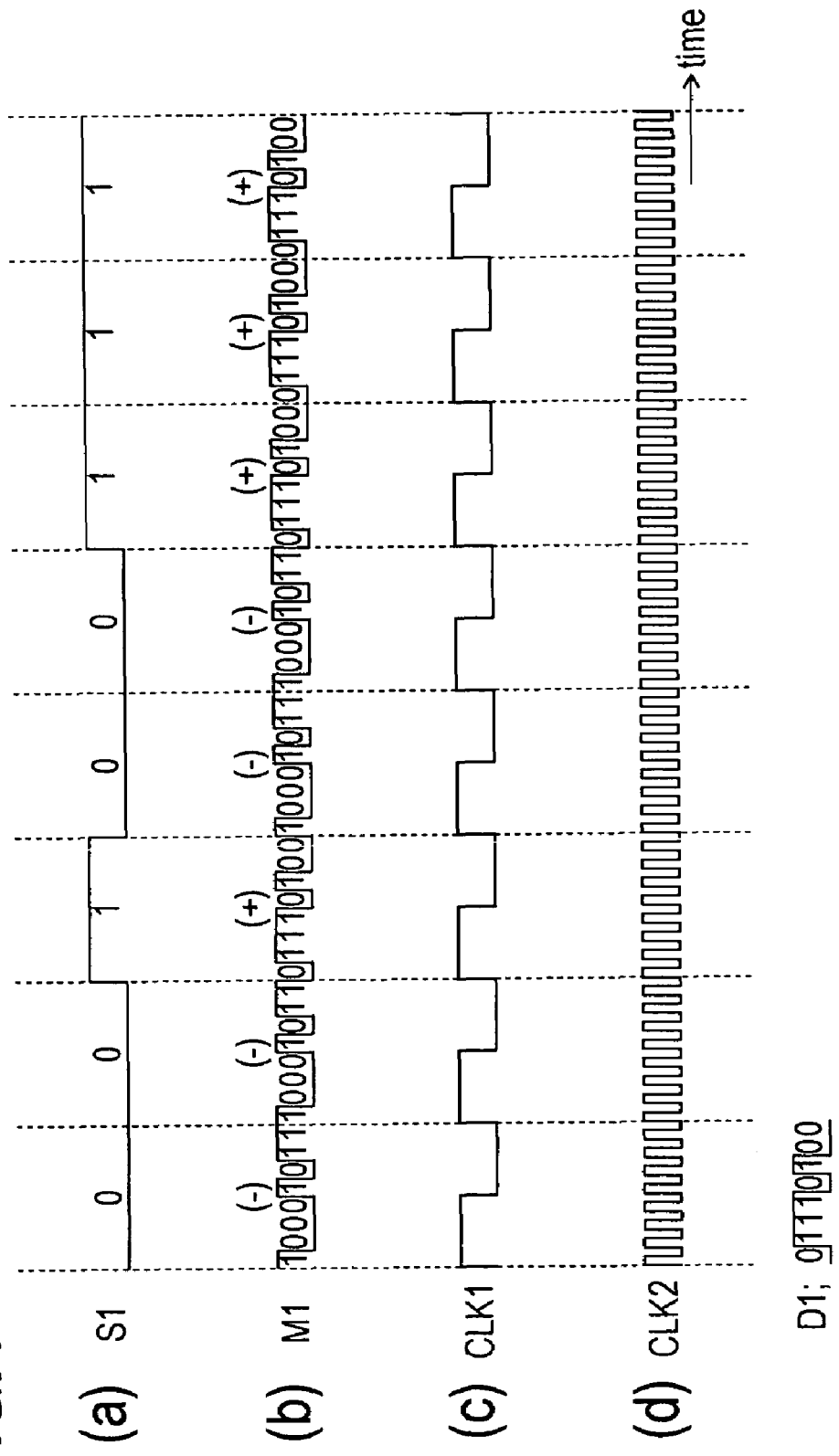
FIG. 4 is a timing chart showing a normal communication operation of the transceiver according to the embodiment.

FIG. 4 is a timing chart showing an operation of the transceiver 110.

Firstly, the data generators 111-1 to 111-n (See FIG. 2) respectively generate channel signal arrays S1 to Sn and output at the timing of rising edge of a data clock CLK1 (See FIGS. 4(a) and (c)). These channel signal arrays S1 to Sn are input to the corresponding spread modulators 113-1 to 113-n respectively. When transmissions of all channels CH1 to CHn are implemented, the serial-parallel converter 112 does not need to generate the first and second branch signal arrays P1 and P2.

The spread modulators 113-1 to 113-n modulate the input channel signal arrays S1 to Sn in use of the spread codes D1 to Dn (e.g. 8 bits) respectively (See FIG. 4(b)). Accordingly, modulated signals M1 to Mn are generated. The modulated signals M1 to Mn are transmitted to the adder 114 at the timing of a rising edge of a modulation signal clock CLK2 (See FIG. 4(d)).

The adder 114 simply adds the modulated signals M1 to Mn input from each of the spread modulators 113-1 to 113-n. Accordingly, a synchronous type code division multiplexed signal array A is output from the adder 114. With this, when transmissions of all channels CH1 to CHn are implemented, each of the channel signal arrays S1 to Sn is performed with spread modulation in use of a corresponding spread modulator respectively. As a result, the bandwidth used by each of the channels CH1 to CHn are the same as each other.

The code division multiplexed signal array A is branched in the distributor 120 (See FIG. 1) and transmitted to the receivers 130-1 to 130-n. That is, each of the receivers 130-1 to 130-n receives the same code division multiplexed signal array A.

Figure 5:
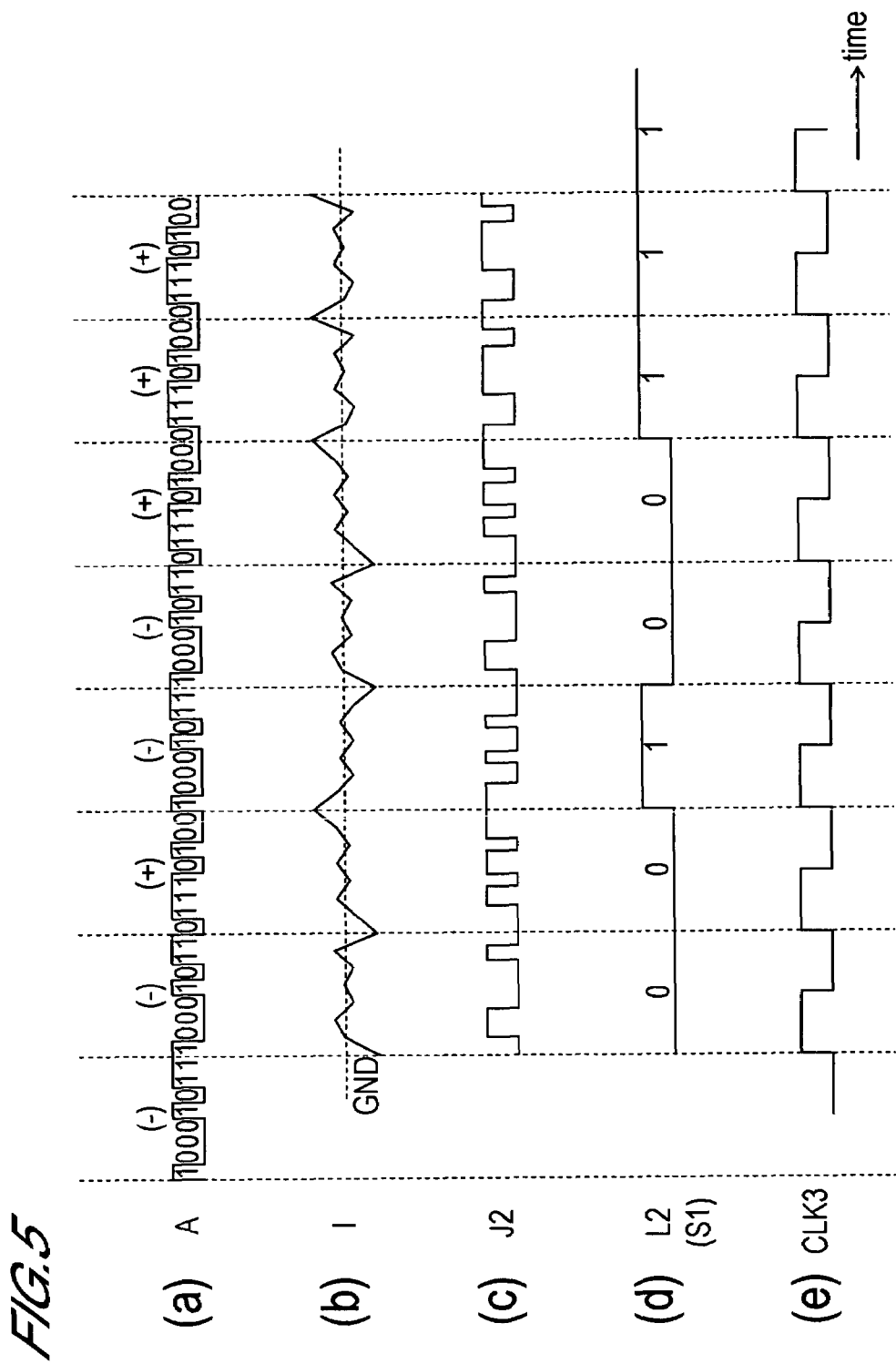
FIG. 5 is a timing chart showing a normal communication operation of the receiver according to the embodiment.
Figure 9:
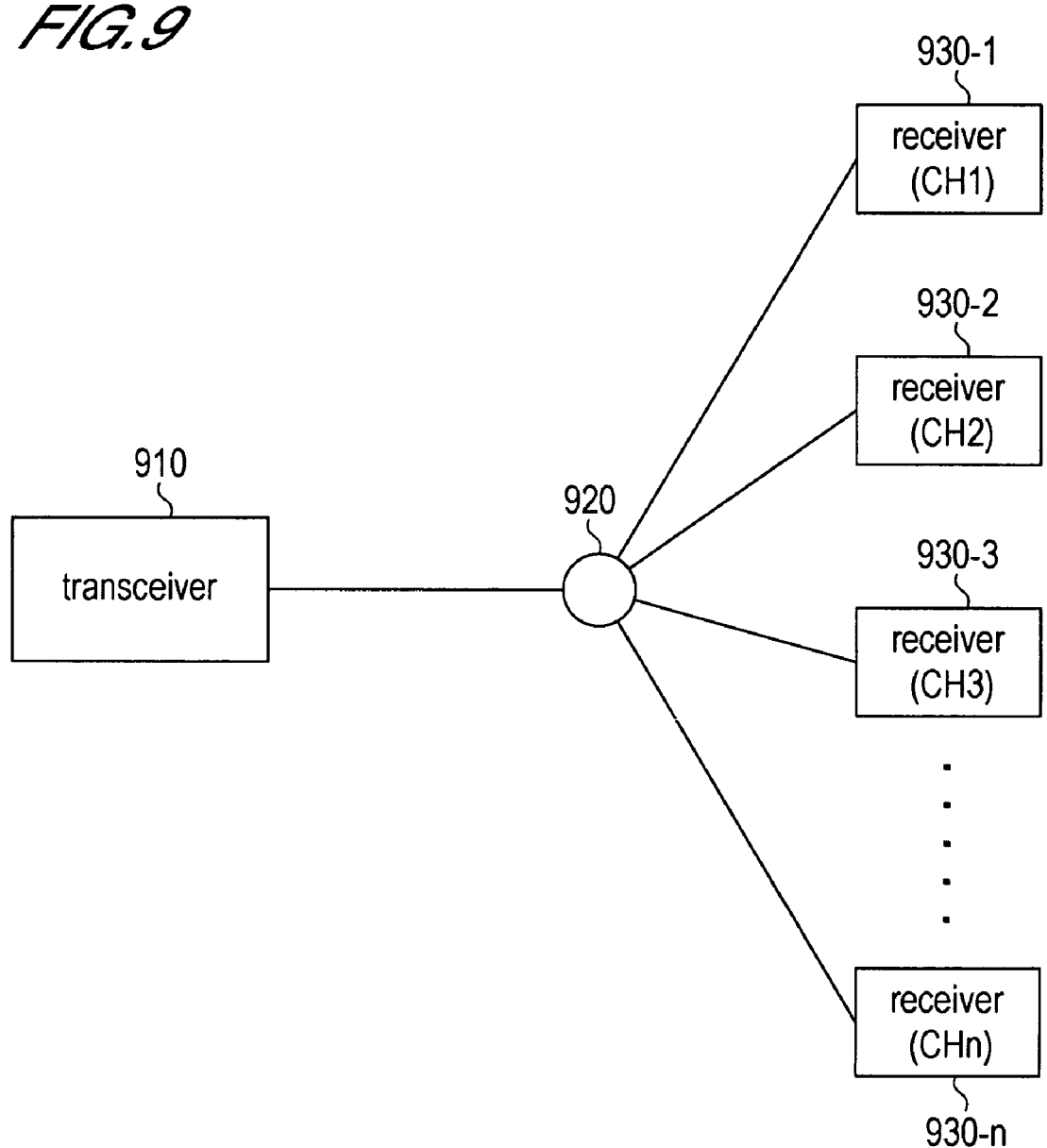
FIG. 9 is a conceptual view showing an example of an entire structure of a conventional communication system.
Figure 10:
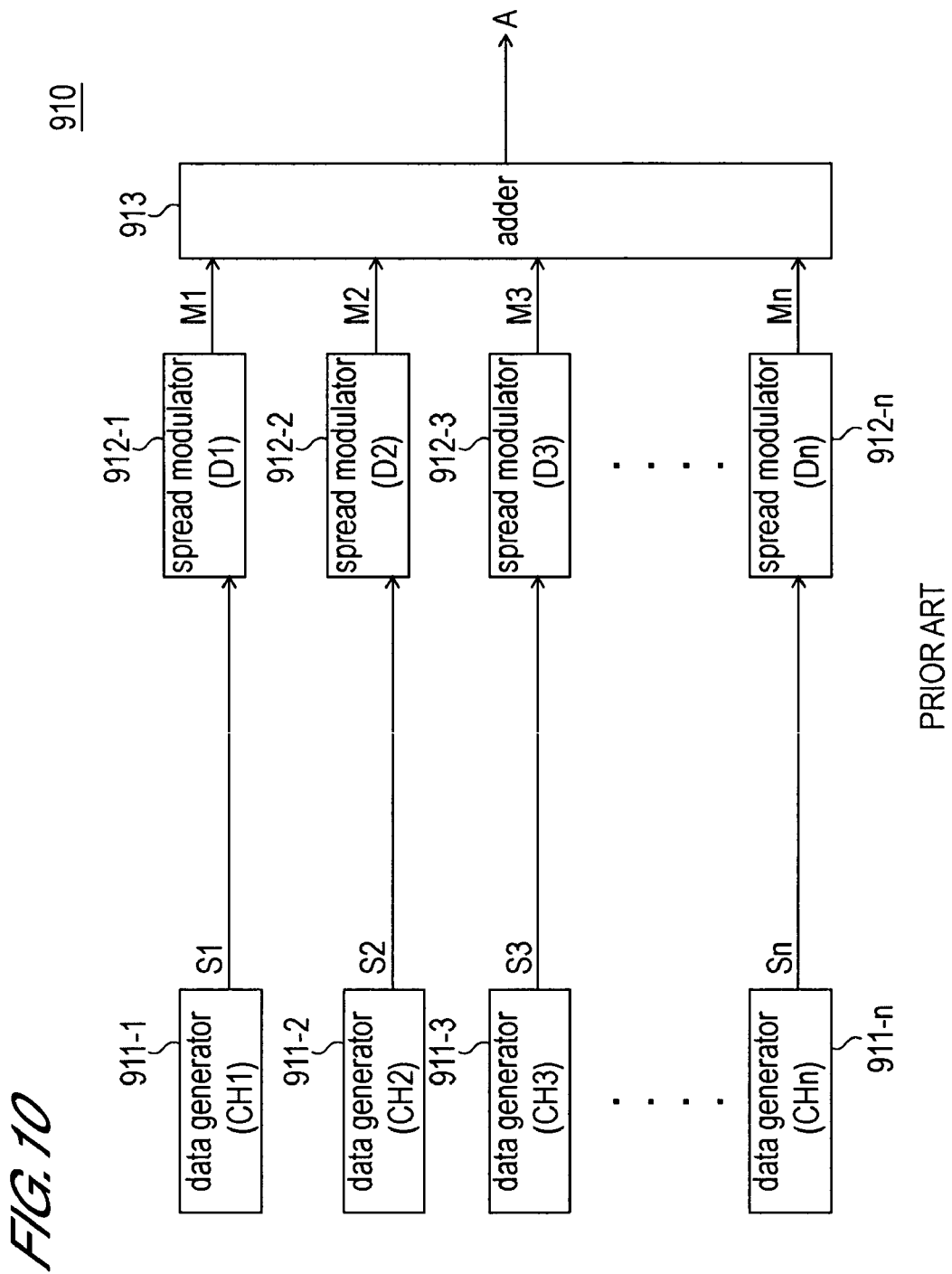
FIG. 10 is a block diagram showing an example of an internal structure of a conventional transceiver.

FIG. 5 is a timing chart showing an operation of the receiver 130-1.

The code division multiplexed signal array A (See FIG. 5(a)) which is received by the receiver 130-1 (See FIG. 3) is transmitted to the matched filter 131. The matched filter 131 extracts a correlation signal I from the received code division multiplexed signal array A in use of the spread code D1 (See FIG. 5(b)). The extracted correlation signal I is transmitted to the first to third comparators 133-1 to 133-3.

The second comparator 133-2, as described above, compares the bit values of the correlation signal I with the threshold value C2 (VL<C2<VH) sequentially. Accordingly, the correlation signal I is converted into a bit signal J2 (See FIG. 5(c)). The signal J2 is latched by the latch 134-2 at the timing of rising edge of the sampling clock CLK3 (See FIG. 5(e)). Accordingly, the signal array L2 which is output from the latch 134-2 to the decoder 136 is the same signal array as the channel signal array S1 (See FIG. 4(a) and FIG. 5(d)).

Along with the second comparator 133-2, the first and third comparators 133-1 and 133-3 compare the bit values of the correlation signal I with threshold values C1 and C3 at any times. However, when the channel CH1 uses only the band corresponding to the channel CH1, the outputs J1 and J3 of the first and third comparators 133-1 and 133-3 are meaningless. Consequently, the outputs L1 and L3 of the latches 134-1 and 134-3 are also meaningless.

Therefore, the decoder 136 outputs only the output signal array L2 of the second latch 134-2 as a restored signal RS1 (See FIG. 3) among the signal arrays L1 to L3 input from the first to third latches 134-1 to 134-3 and discards the output signal arrays L1 and L3 of the first and third latches 134-1 and 134-3.

Operations of other receivers 130-2 to 130-n are the same as that of the receiver 130-1 or a conventional receiver (See FIG. 11), so the explanation is omitted here.

An operation for communication of channel CH1 in use of a band corresponding to the channels CH1 and CH2 will be described with reference to FIGS. 6 to 8.

FIG. 6 is a timing chart showing an operation of the transceiver 110.

Similar to the above described example of an operation (See FIG. 4), the data generators 111-3 to 111-n generate channel signal arrays S3 to Sn respectively and output at the timing of rising edge of the data clock CLK1 (See FIG. 6(h)). In addition, the data generator 111-1 generates channel signal array S1 in twice the rate of the data generators 111-3 to 111-n and outputs at the timing of the rising edge of a data clock CLK4 (See FIGS. 6(a) and (g)). On the other hand, the data generator 111-2 does not generate channel signal array S2.

Similar to the above described example of the operation (See FIG. 4), the channel signal arrays S3 to Sn are simply input to the spread modulators 113-3 to 113-n. On the other hand, the channel signal array S1 is input to the serial-parallel modulator 112. The serial-parallel modulator 112 branches the channel signal array S1 into two by sorting the bits alternately by 1 bit. Accordingly, the first and second branch signal array P1 and P2 are generated (See FIGS. 6(b) and (c)). In the example of FIG. 6, even number bits are P1 and odd number bits are P2. The data rate of these branch signal arrays P1 and P2 are half of that of the channel signal array S1 and the same as those of other channel signal arrays S3 to Sn. As described above, the first and second branch signal arrays P1 and P2 are input to the spread modulators 113-1 and 113-2. Accordingly, synchronous signal arrays P1, P2, and S3 to Sn are input to the spread modulators 113-1 to 113-n.

The spread modulators 113-3 to 113-n modulate the channel signal arrays S3 to Sn in use of the spread codes D3 to Dn of the corresponding channels CH3 to CHn. The spread modulator 113-1 modulates the first branch signal array P1 in use of the spread code D1 of the channel CH1 (See FIG. 6(d)). In addition, the spread modulator 113-2 modulates the second branch signal array P2 in use of the following method.

FIG. 8A is a table showing a modulating method of the modulated signal. In FIG. 8A, "p1" is a signal included in the first branch signal array P1. "p2" is a signal which is synchronous with the p1 among the signals included in the second branch signal array P2. In other words, p1 and p2 are input to the spread modulator 113-2 simultaneously.

As shown in FIG. 8A, when the corresponding bit signals p1 and p2 are the same, that is, when p1=p2=0 or p1=p2=1 ("0" and "1" are logical values), the spread modulator 113-2 simply performs spread modulation on the bit signal p2 of the second brdanch signal array P2 in use of the spread code D1. Therefore, each bit value of the modulated signal M2 (See FIG. 2) becomes same as the bit value of the modulated signal M1, and so the distinction of the inversion code/regular code become same. In FIG. 8A, '0' indicates the inversion code and '1' indicates the regular code. On the other hand, when the bit signals p1 and p2 are not the same, the spread modulator 113-2 performs output in high impedance Z (See FIG. 6(e)).

The modulated signals M1 to Mn output from the modulators 113-1 to 113-n are, as described above, added to each other in the adder 114. Accordingly, the code multiplexed signal array A is generated. Here, the sum of the modulated signal arrays M1 and M2 becomes a component of the channel CH1 of the code division multiplexed signal array A. As described above, VL is −1 and VH is +1 in the present embodiment, and the spread modulator 113-2 sets output to high impedance Z when the bit signals p1 and p2 are not same, the signal value corresponding to the channel CH1 becomes −2 (=2×VL) when (p1, p2)=(0, 0), −1(=VL) when (p1, p2)= (0, 1), +1(=VH) when (p1, p2)=(1, 0), and +2(=2×VH) when (p1, p2)=(1, 1) (See FIG. 6(f) and FIG. 8A). Therefore, in channel CH1, quaternary signals are transmitted in use of bandwidth twice as other channels CH3 to CHn.

FIG. 7 is a timing chart showing an operation of the receiver 130-1.

The receiver 130-1 receives the code division multiplexed signal array A via the distributor 120 (See FIG. 1). The code division multiplexed signal array A includes the component of the channel CH1 (See FIG. 7(a)). The receiver 130-1 demultiplexes the signal component from the code division multiplexed signal array A and reproduces the channel signal array S1 as described below.

The matched filter 131 (See FIG. 3) performs code division demultiplexes in use of the spread code D1. Accordingly, a correlation signal array I corresponding to the channel CH1 can be taken from the code division multiplexed signal array A (See FIG. 7(b)).

The correlation signal array I is transmitted to the first to third comparators 133-1 to 133-3 in parallel. The first comparator 133-1 compares the correlation signal value and the threshold value C1 (VH<C1<2×VH) sequentially, the second comparator 133-2 compares the correlation signal value and the threshold value C2 (VL<C2<VH) sequentially, and the third comparator 133-3 compares the correlation signal value and the threshold value C3 (2×VL<C3<VL) sequentially. Accordingly, determination signals J1 to J3 are generated in the first to third comparators 133-1 to 133-3 (See FIG. 7(c) to (e)). The determination signals J1 to J3 are input to the corresponding latches 134-1 to 134-3.

The latches 134-1 to 134-3 latch the corresponding determined signals J1 to J3 at the timing of rising edge of the sampling clock CLK3 (See FIG. 7(l)). Accordingly, determination signals J1 to J3 at the timing of the rising edge are output as demultiplexed signals L1 to L3 from the latches 134-1 to 134-3 (See FIG. 7(f) to (h)).

The decoder 136 judges the signal value of the correlation signal array I from the demultiplexed signals L1 to L3. As described above (See FIG. 8A), the correlation signal array I may be one of four values (−2, −1, +1 or +2). Then, the correlation signal value becomes "−2" when the L1 to L3 are all "0", "−1" when only the L3 is "1", "+1" when only the L2 and L3 are "1", and "+2" when the L1 to L3 are all "1" (See FIG. 8B). In this way, the decoder 136 generates the restored branch signal arrays RP1 and RP2 from the extract signals L1 to L3.

The parallel-serial converter 137 inputs the restored branch signal arrays RP1 and RP2 from the decoder 136 and converts them into serial signals. Accordingly, restored channel signal array RS1 is generated and output to outside. The rate of the restored channel signal array RS1, that is, a sampling clock frequency (See FIG. 7(m)) is the same as that of the signal array S1 generated in the data generator 111-1 of the transceiver 110 (See FIG. 2) and is twice as those of other channel signal arrays S3 to Sn.

As described above, in the communication system 100 of the present embodiment, when a signal array corresponding to the channel CH1 is transmitted, it is possible to switch communication in use of a band of a single channel and communication in use of a band of two channels. In other words, in the communication system 100, when the channel CH2 is not used, the band of the channel CH2 can be used for the communication of the channel CH1. Therefore, according to the present embodiment, the bandwidth efficiency can be improved.

Further, when a band corresponding to the channel CH2 is used for the communication of the channel CH1, the receiver 130-1 for the channel CH1 uses only spread code D1 for the channel CH1 and does not use spread code D2 for the channel CH2. Therefore, the spread code D2 need not to be stored in the receiver 130-1. Therefore, when the receiver 130-1 uses the band of the channel CH2, the receiver 130-2 cannot read the communication data. In addition, when the receiver 130-2 uses the band of the channel CH2, the receiver 130-1 cannot read the communication data. Therefore, according to the present embodiment, security is not reduced.

In addition, when band of two channels are used, a single spread code is used so that the receiver 130-1 may be provided with a single matched filter 131. Therefore, the increase of the cost of the receiver can be prevented.

According to the present embodiment, an example in that the present invention is applied to a communication system using electronic signals, however, the present invention may be applied to an optical communication system, a radio communication system or the like.

What is claimed is:

1. A code division multiplexing communication system which contains transceiver having:
  a first data generator which generates a first channel signal array having signal values VL and VH (VL<VH, VL≠0, VH≠0, 2×VL≠VH);
  a data distributor which branches the first channel signal array into a first branch signal array and a second branch signal array which are synchronous with each other;
  a first spread modulator which performs spread modulation on the first branch signal array in use of a first spread code;
  a second spread modulator which converts the second branch signal array to a signal array having signal values VL, VH and high impedance, and performs spread modulation on the modulated signal array in use of the first spread code; and an adder which superimposes the modulated signal arrays output from the first and the second spread modulator to generate a code division multiplexed quaternary signal array.

2. A code division multiplexing communication system according to claim 1, wherein the second spread modulator outputs the signal values of the second branch signal array when the values of the first and the second branch signal array are the same and outputs high impedance when the values of the first and the second branch signal array are not the same.

3. A code division multiplexing communication system according to claim 1, wherein the first spread modulator includes a function to directly input the first channel signal array from the first data generator, to perform spread modulation in use of the first spread code and to provide the modulated signal array to the adder.

4. A code division multiplexing communication system according to claim 1, further comprising a second data generator which generates a second channel signal array having a binary signal and provide it to the second spread modulator.

5. A code division multiplexing communication system according to claim 4, wherein the second spread modulator includes a function to input the second channel signal array from the second channel generator, to perform spread modulation in use of a second spread code and to provide the modulated signal array to the adder.

6. A code division multiplexing communication system according to claim 1, further comprising:
a third data generator which generates a third channel signal array having a binary signal; and
a third spread modulator which performs spread modulation on the binary signal array input from the third data generator in use of the third spread code and provides the modulated signal array to the adder.

7. A code division multiplexing communication system according to claim 1, wherein the data distributor comprises a serial-parallel modulator which branches the first channel signal array into the first and the second branch signal arrays by performing serial-parallel modulation.

8. A code division multiplexing communication system according to claim 1, further comprising a receiver having:

a data demultiplexer which performs code division demultiplexing on a signal array received from the transceiver in use of the first spread code;
a determiner which determines a value of a signal bit demultiplexed by the data demultiplexer is either 2×VL, VL, VH or 2×VH; and
a data restorer which restores signal bits of the first and the second branch signal arrays based on a determination result of the determiner and to restore the first channel signal array from the first and the second branch signal arrays.

9. A code division multiplexing communication system according to claim 8, wherein the determiner further comprising:
a first comparator which compares the signal bit value and a threshold value C1 (VH<C1<2×VH);
a second comparator which compares the signal bit value and a threshold value C2 (VL<C2<VH); and
a third comparator which compares the signal bit value and a threshold value C3 (2×VL<C3<VL).

10. A code division multiplexing communication system according to claim 9, further comprising a first to a third latch which latch comparison result output from the first to the third comparator, respectively and provide them to the data restorer at the same timing.

11. A code division multiplexing communication system according to claim 8, wherein the data restorer comprising:
a decoder which restores the first and the second branch signal array based on a comparison result of the first to the third comparator; and
a parallel-serial modulator which restores the first channel signal array by performing parallel serial conversion on the first and the second branch signal arrays which are restored by the decoder.

12. A code division multiplexing communication system according to claim 11, wherein:
the first spread modulator includes a function to directly input the first channel signal array from the first data generator and perform spread modulation in use of the first spread code and;
the data restorer includes a function to simply output a comparison result of the second comparator as the restored first channel signal array.

* * * * *